United States Patent [19]
Cha et al.

[11] Patent Number: 5,164,054
[45] Date of Patent: Nov. 17, 1992

[54] LOW-COST PROCESS FOR HYDROGEN PRODUCTION

[76] Inventors: Chang Y. Cha, 7541 Terry Ct., Golden, Colo. 80403; Hans F. Bauer, 211A Morgan Dr., Morgantown, W. Va. 26505; Robert W. Grimes, 127 Harmony La., Laramie, Wyo. 82070

[21] Appl. No.: 784,870

[22] Filed: Oct. 30, 1991

Related U.S. Application Data

[60] Division of Ser. No. 380,408, Jul. 17, 1989, abandoned, which is a continuation-in-part of Ser. No. 343,728, Apr. 26, 1989, abandoned.

[51] Int. Cl.$^5$ .......................... C01B 3/12; C01B 3/24; C01B 31/18; C01B 31/20
[52] U.S. Cl. .......................... 204/157.47; 204/157.52; 423/415 A; 423/450; 423/648.1; 423/650; 423/437
[58] Field of Search ............ 423/415 A, 648.1, 437 R, 423/437 M; 204/157.47, 157.52

[56] References Cited

U.S. PATENT DOCUMENTS 4,435,374 3/1984 Helm ............................... 423/415 A Primary Examiner—Wayne Langel

[57] ABSTRACT

A method is provided for producing hydrogen and carbon black from hydrocarbon gases comprising mixing the hydrocarbon gases with a source of carbon and applying radio-frequency energy to the mixture. The hydrocarbon gases and the carbon can both be the products of gasification of coal, particularly the mild gasification of coal. A method is also provided for producing hydrogen and carbon monoxide by treating a mixture of hydrocarbon gases and water with radio-frequency energy.

10 Claims, 3 Drawing Sheets

LOW-COST PROCESS FOR HYDROGEN PRODUCTION

This application is a division of application Ser. No. 07/380,408, filed Jul. 17, 1989, now abandoned, which itself is a continuation-in-part of application Ser. No. 07/4343,728, filed Apr. 26, 1989, now abandoned.

FIELD OF THE INVENTION

The present invention relates to a process for producing hydrogen from hydrocarbons using radiofrequency energy as a non-chemical catalyst.

This application is a continuation-in-part of application Ser. No. 07/343,728, filed Apr. 26, 1989, for Mild Coal Gasification System, which application is incorporated herein by reference.

BACKGROUND OF THE INVENTION

Production of hydrogen using conventional processes such as steam reforming and coal gasification requires high temperatures on the order of 1400°-1700° F. and chemical catalysts. Supplying the energy to maintain these high temperature reactions, and use of these types of catalysts, is very expensive. In addition, the gaseous products of coal gasification contain heteroatom that must be removed to prevent poisoning of the catalyst.

The production, efficient use, and recovery of hydrogen accounts for over 50 percent of the capital cost of a direct coal liquefaction plant. Hydrogen is used to increase the conversion of coal to liquid products with boiling points similar to petroleum and for hydrotreating to upgrade the quality of the liquid products. Hydrogen for direct liquefaction is expected to come from the nonliquid residue. However, the amount of residue produced from the liquefaction processes with high coal conversion may not be sufficient to provide the hydrogen requirements for the process Mild gasification processes also produce liquids, gaseous products, and much more char than direct liquefaction processes. Therefore, careful integration of direct liquefaction and mild gasification processes will result in increased liquid yields, better economics, and better quality products because of the increased amount of hydrogen available for product upgrading. To produce hydrogen from mild gasification char and gas products, it is necessary to develop a new technology that is more efficient than conventional technologies.

Gasification of coal involves subjecting the coal to processing conditions which are sufficiently severe to bring the coal to a state at which it can be gasified. In mild gasification of coal, low temperature carbonization is performed at temperatures in the range of from 450° to 750° C. Mild thermal decomposition of the coal occurs, yielding "semi-coke" or "char" and "low temperature tar". The char contains considerable quantities of volatiles and complex hydrocarbons.

The char produced from mild gasification processes has a high ash and carbon content and significant amounts of heteroatoms. The hydrogen purity requirements for direct liquefaction processes are significantly lower than for most other applications. However, some components of gasification product gas such as hydrogen sulfide must be eliminated to avoid poisoning the hydrogenation catalysts used in the subsequent parts of the process.

Conventional hydrogen production methods such as steam reforming require temperatures above 900° C. as well as chemical catalysts. It is not only difficult, but also expensive to provide the thermal energy required for the reaction of char with steam at high temperatures. Therefore, it would be helpful to develop a technique that does not require the use of chemical catalysts and high temperatures.

High-frequency electromagnetic waves, or RF energy, are a noble form of energy that can be applied to enhance the rate of those reactions that can proceed only by some higher-energy free radical mechanism because the equilibrium thermodynamics are unfavorable, and those reactions that should proceed because of favorable thermodynamics, but are kinetically limited and normally require the use of a catalyst to increase the rate.

The interaction of electromagnetic fields with polar components of molecules produces free radicals and causes electrical energy to be transformed into heat. This interaction results from the response of charged components to the applied field. The displacement of these charged components from their equilibrium positions gives rise to induced dipoles that respond to the applied field. In addition to induced dipoles, some polar components contain permanent dipoles because of the asymmetric charge distribution of unlike charge partners in molecules that tend to reorient under the influence of a changing electric field. This charge gives rise to orientation polarization. Finally, another source of polarization arises from charge buildup in interfaces between components in heterogeneous systems. These are termed interfacial, space-charged, or Maxwell-Wagner polarization. These two mechanisms are the basis of radiofrequency energy processes. The lag between the zero crossing of the applied field and relaxation of molecules causes a conversion of radiofrequency energy into heat by friction between molecules. The lag is called the relaxation time and is widely used by physical chemists to study structures of molecules. Relaxation times may be $1 \times 10^{-6}$ seconds for large molecules such as polymers, and $1 \times 10^{-12}$ sec. for small molecules such as water. Relaxation times are slow for hindered molecules like solids and viscous liquids, and are fast for free moving liquids and gases.

Helm, Jr., in U.S. Pat. No. 4,435,374, discloses a method for gasifying solid carbonaceous material to form carbon monoxide and hydrogen by contacting the material with superheated steam at at least 650° C. and irradiating the product of this contacting with an amount of microwave energy sufficient to gasify the carbon.

Waltrip, in U.S. Pat. No. 3,480,529, discloses a method for dissociating chemical elements from a medium containing these elements using an audiofrequency harmonic tone having a predetermined rate of vibration selected on the basis of the element to be manipulated. This method is primarily directed to desalinating water and purifying sewage.

Zavitsanos et al., in U.S. Pat. No. 4,076,607, disclose a method of coal desulfurization wherein the coal is irradiated with microwave energy which rearranges the chemical bonds between the sulfur and other compounds in the coal. Sulfur is liberated in the form of at least one stable gaseous compound, such as hydrogen sulfide, sulfur dioxide, or sulfur carbonyl.

Knoevenagel et al., in U.S. Pat. No. 3,977,952, disclose a method for decomposing carboncontaining compounds by subjecting compositions containing these compounds to radiation of a wavelength of about 20 to 600 nm in the presence of water and oxygen.

Bodine, Jr., in U.S. Pat. No. 2,745,861, discloses the use of sound waves to produce carbon monoxide, synthesis gases, and synthetic hydrocarbons from combustible raw materials such as powdered coal, coke, wood flour, etc.

Hodge, in U.S. Pat. No. 2,542,028, discloses the use of high-frequency apparatus for the controlled heating of carbonaceous minerals to form hydrocarbon oils and distilling the hydrocarbon oils thus produced.

Rafflower, in U.S. Pat. No. 1,624,625, discloses a process for desulfurizing coal, water, or mixed gases by contacting the material to be desulfurized with ferric oxide, which immediately reacts with the sulfur.

Kruesi et al., in U.S. Pat. No. 4,311,520, disclose the use of microwave energy as the source of heat for recovering nickel, cobalt, or manganese from their oxides or silicates.

SUMMARY OF THE INVENTION

It is an object of the present invention to overcome the above-noted disadvantages of the prior art.

It is another object of the present invention to provide an improved method for obtaining hydrogen from hydrocarbons.

It is yet another object of the present invention to provide a method for producing hydrogen from the products of a mild coal gasification process.

According to the present invention, high-frequency electromagnetic waves, alternatively referred to as radiofrequency energy, are a form of energy that can be applied to enhance the rates of char gasification, steam-char reaction, hydrocarbon gas dissociation, and hydrogen sulfide removal.

Carbon is an excellent absorber of radiofrequency energy as well as an excellent reducing agent. When radiofrequency energy is applied to char, the surface temperature increases very rapidly. If a gas containing oxygen, such as steam, contacts char in the radiofrequency energy field, the carbon in the char rapidly captures the oxygen from the gas, forming hydrogen and carbon monoxide. The carbon monoxide is further reacted (shifted) to form carbon dioxide and additional hydrogen. Radiofrequency energy also catalyzes the dissociation of hydrocarbon gases such as ethane and methane to produce hydrogen and carbon black. Therefore, hydrogen can be produced at much lower temperatures without chemical catalysts. Iron oxides can also be added to the gas stream where radiofrequency energy can catalyze the reaction with hydrogen sulfide to produce solid iron sulfide.

Carbon is an excellent radiofrequency energy absorber and also a good reducing agent. When char is placed in radiofrequency electric fields, its temperature rapidly increases, and a tremendous temperature gradient will be established between the bulk gas phase and char particles. If the molecules containing oxygen pass through the char bed, carbon in the char will capture oxygen from these molecules. For example, steam will react at a much faster rate at lower temperatures when it contacts char in a radiofrequency electric field. In addition, oxygen in char may easily be combined with carbon to produce carbon monoxide. As a result, the hydrogen may be produced from char and steam at a lower temperature than steam reforming, and without the requirement for chemical catalysts.

The process of the present invention is particularly useful in converting the products from the mild gasification of coal into hydrogen and activated carbon. In the mild gasification of coal, the coal is crushed, dried, and pyrolyzed to produce oil, gas, and char. The oil is recovered for use, and the gas, which is generally light hydrocarbon gases such as methane and/or ethane, and char can be conveyed directly to the reactor for conversion to hydrogen and activated carbon.

The radiofrequency energy which can be used in the process according to the present invention ranges from about 2450 MHz to about 5000 MHz. However, it has been found that optimum results are obtained when the radiofrequency energy is about 2450 MHz.

Radiofrequency energy can be used to supply the heat of reaction for the following reactions:

Decomposition

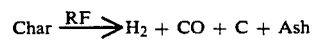

Steam-Char Reaction:

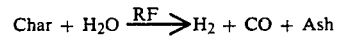

Water-Gas Shift Reaction:

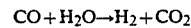

The mild gasification processes produce a gaseous product that contains hydrogen, carbon monoxide, and hydrocarbon species. The carbon monoxide and hydrocarbon species can also be converted to hydrogen using radiofrequency energy:

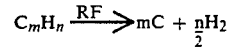

The above reactions can easily be combined with char conversion reactions. The mild gasification product gas contains hydrogen sulfide that must be removed. Iron oxide may be mixed with char to capture sulfur when hydrogen sulfide is decomposed, producing hydrogen and sulfur. Radiofrequency energy also accelerates the reaction:

The energy consumption for producing hydrogen from char and product gas from mild gasification processes will not be significantly different from that of other processes because of the efficient use of energy. The only radiofrequency energy required for the process is to produce the energy for the heats of reactions. Steam can be superheated to reduce the energy requirements from radiofrequency energy.

DETAILED DESCRIPTION OF THE INVENTION

According to the present invention, products from mild gasification of coal, char and product gases, are reacted at low temperatures and pressures using radiofrequency energy to produce hydrogen. This hydrogen can be used in direct liquefaction processes, for fuel cells, and the like.

Figure 1:
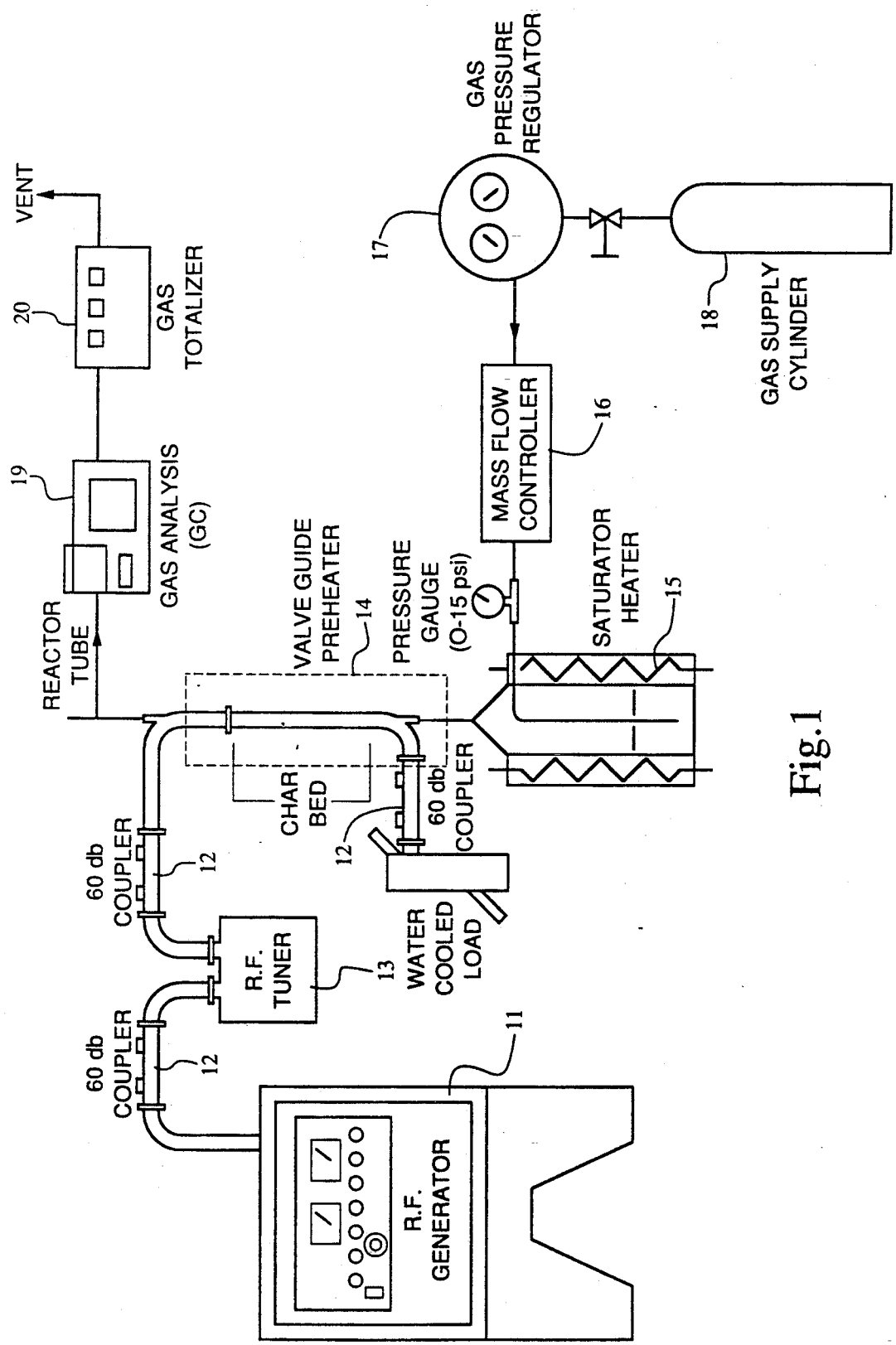
FIG. 1 illustrates a radiofrequency reactor system for low-cost hydrogen production according to the present invention.

One apparatus that can be used for the electromagnetic-catalyzed production of hydrogen according to the present invention is shown in FIG. 1. The system comprises a radiofrequency generator 11, a circulator, direction couplers 12, impedance-matching device (tuner) 13, a waveguide preheater 14, a saturator heater 15, a mass flow controller 16, a gas pressure regulator 17, a gas supply cylinder 18, a gas analysis means (gas chromatography), and a gas totalizer 20.

The radiofrequency generator is adjustable from 0 to about 6000 watts at a fixed frequency of about 450 MHz to about 5000 MHz. The load impedance of the reactor is matched to the radiofrequency generator impedance by tuning the impedance-matching device to minimum reflected power (maximum forward power) a indicated by the directional coupler. As the material inside the reactor adsorbs energy, its dielectric properties change, causing the load impedance to change with time. The impedance-matching device is adjusted as needed to compensate for the change. The circulator protects the radiofrequency generator from high levels of reflected power that could occur between successive readjustments of the impedance-matching device.

Coals vary widely in their composition and properties, and it is not uncommon that coal from the same mine can exhibit as much variety as, or more variety than, that observed for coal from different mines. Thus, absolute composition predictability is generally not attainable, and the gasification product from the coals may not always be consistent. For this reason, the amount of steam required will vary directly with the amount of carbon in the char.

The desirability for gasification of an individual sample of coal is dependent on its reactivity, moisture content, swelling, and caking properties, ash content and ash properties. Anthracite coal, which has the highest carbon content, produces a char with the greatest percentage of carbon in the char. Bituminous coal also has a high carbon content, while sub-bituminous coal and lignite coal have relatively low carbon contents.

The amount of iron oxide used to remove sulfur from the hydrocarbon gases depends on the amount of sulfur originally present in the gases. In general, approximately one mole of ferric oxide is required to remove one mole sulfur from the hydrocarbon gases.

Although the present invention can be practiced with continuous irradiation of the carbon source, further efficiency of radiofrequency utilization is obtainable by pulsing the radiofrequency energy in its delivery to the carbon source. Continuous high power irradiation is more expensive than pulsed irradiation, because pulsing affords the obtaining of a very powerful radiofrequency energy input along with the achievement of a low average power consumption.

A typical pulsing frequency is about 60 pulses/second; however, one skilled in the art can appreciate that a wide range of pulsing frequencies is suitable for the claimed invention. The choice of a particular frequency depends upon which yields optimum results with the carbon source.

Load impedance matching is also to be considered. It is desirable to optimize the transfer of radiofrequency energy from its source to a destination or "load", i.e., the carbon source. To minimize losses, a good compatibility of the load with the radiofrequency energy output is effected. A measure of compatibility, derived from impedance, is called the impedance match. Thus, the energy output is matched to the load impedance so that the effective radiofrequency power is completely given up to the load.

If a favorable impedance match is not achieved, the load reflects a portion of the input wave and a standing wave, which interferes with further irradiation, is established. The ratio of the maximum to minimum potential in this standing electric field is called the Voltage Standing Wave Ratio, or VSWR. The reciprocal for the VSWR is called the matching factor. The VSWR provides an indication of a limit on how efficiently the source can push energy through the gasification system.

Production of Hydrogen from Hydrocarbon Gases

The reactor used for the preliminary tests was a simple Vycor tube located inside the wave guide. A travelling wave applicator (waveguide) was used to transfer radiofrequency energy to the material inside the reactor. Vycor was used for the reactor because it does not absorb radiofrequency energy directly and behaves as a transparent wall to the radiofrequency wave.

The reactor contains carbon black or char, and gas flows from the bottom to the top. The radiofrequency wave travels in the wave guide from the top to the bottom, countercurrent to the gas flow in the reactor. Radiofrequency energy is absorbed by the material inside the reactor.

In order to produce hydrogen from hydrocarbon gases, the reactor was filled with carbon black. The carbon black inside the reactor was fluidized with methane. When the methane flow was stabilized, radiofrequency energy was applied, and the methane and hydrogen concentrations of outlet gas were continuously monitored.

Figure 2:
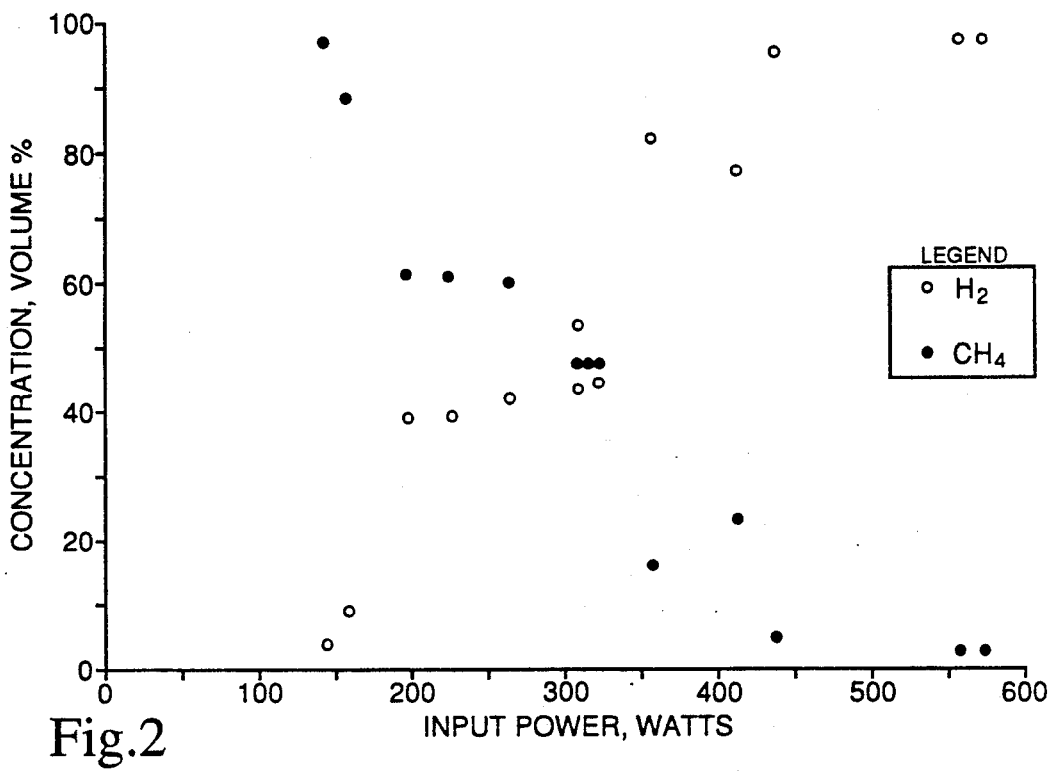
FIG. 2 shows the concentration of hydrogen and methane in the outlet gas from a radiofrequency reactor using carbon black.
Figure 3:
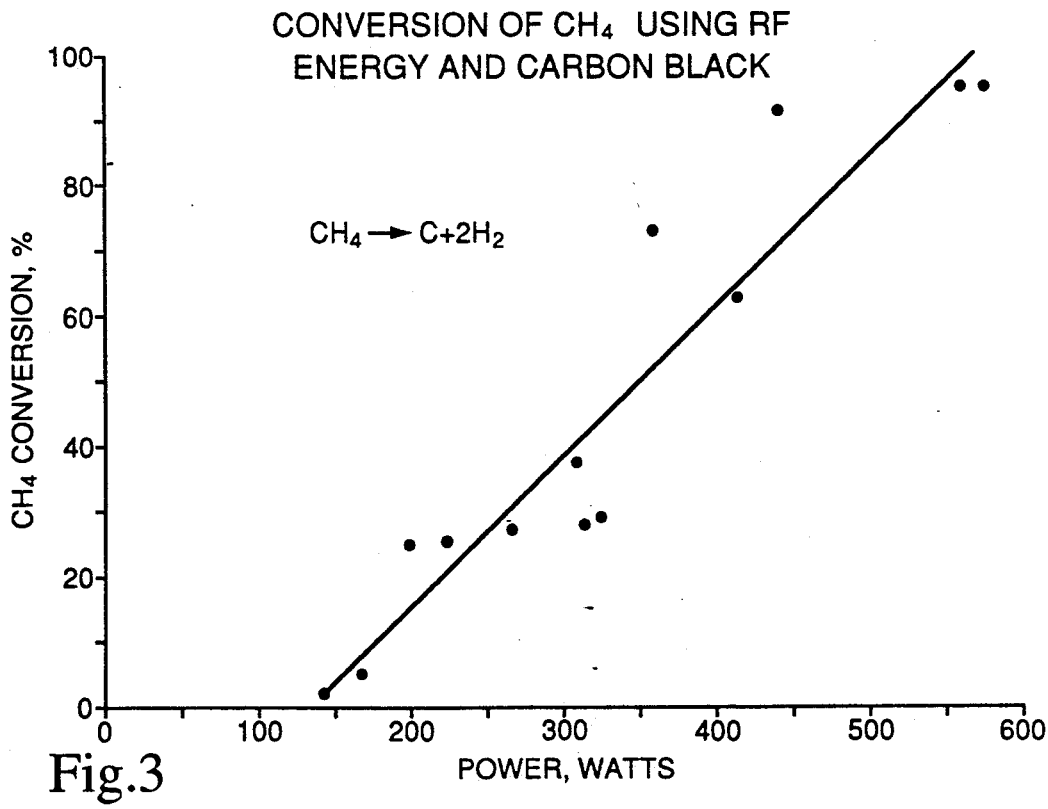
FIG. 3 shows the conversion of methane using radiofrequency energy and carbon black.

FIG. 2 shows the hydrogen and methane concentrations in the outlet gas at various radiofrequency power inputs. The conversion of methane is shown in FIG. 3 as a function of applied radiofrequency power. Methane began to dissociate at about 150 watts of radiofrequency power. A 96% conversion was reached at 550 watts. The outlet gas temperature was less than 180° F.

To find the technical feasibility for producing hydrogen from mild gasification product gas, the gas produced from eastern oil shale retorting was introduced into the radiofrequency reactor filled with carbon black. Compositions of oil shale gas and outlet gas at 550 watts of radiofrequency energy are shown in Table 1. All of the hydrocarbon gases were decomposed into hydrogen and carbon black. Carbon dioxide reacted with carbon black to produce carbon monoxide. However, only about 40% of the hydrogen sulfide was decomposed to produce hydrogen and sulfur. Hydrogen sulfide needs to be completely removed to prevent catalys poisoning.

TABLE 1

Gas Composition (vol %),
Eastern Oil Shale Product Gas Decomposition

| Component | Inlet Gas (Oil Shale) | Outlet Gas |
|---|---|---|
| $H_2$ | 23.71 | 59.93 |
| $N_2$ | 30.25 | 22.17 |
| CO | 0.86 | 8.54 |
| $CH_4$ | 9.74 | 0.17 |
| $CO_2$ | 5.29 | 0 |
| $C_2H_6$ | 3.27 | 0 |
| $C_2H_4$ | 0.69 | 0 |
| $C_3H_8$ | 1.48 | 0 |
| $C_3H_6$ | 1.04 | 0 |
| $C_4$ | 1.08 | 0 |
| $C_5$ | 0.55 | 0 |
| $H_2S$ | 20.66 | 9.20 |

Carbon black, 9.5 grams, was mixed with 1.5 rams of iron oxide ($Fe_2O_3$) to capture sulfur produced from decomposition of hydrogen sulfide. A standard gas used to calibrate chromatographs was used for the test. Compositions of gases produced from carbon black alone and the mixture of carbon black and iron oxide are shown in Table 2, along with the composition of the standard gas. All hydrogen sulfide was decomposed when iron oxide was used with carbon black, as shown in this table. However, the concentration of hydrogen sulfide in the outlet gas was 1.46% when only carbon black was used. No hydrogen sulfide wa detected in the outlet gas at 450 watts when iron oxide was used. At 550 watts, decomposition of methane and carbon dioxide was almost complete.

TABLE 2

Gas Composition (vol. %),
$H_2S$ Removal Test

| Component | Inlet Gas | C Alone 500 Watts | Outlet Gas C + $Fe_2O_3$ 450 Watts | Outlet Gas C + $Fe_2O_3$ 550 Watts |
|---|---|---|---|---|
| $H_2$ | 30.2 | 34.29 | 35.2 | 35.0 |
| $N_2$ | 24.93 | 16.84 | 25.0 | 20.3 |
| CO | 5.02 | 47.36 | 11.0 | 41.3 |
| $CH_4$ | 5.02 | 0.05 | 4.7 | 0.1 |
| $CO_2$ | 29.90 | 0.0 | 24.1 | 3.3 |
| $H_2S$ | 4.93 | 1.46 | 0.0 | 0.0 |

Production of Hydrogen from Mild Gasification Char

Char produced from mild gasification of coal as described more completely in patent application Ser. No. 07/343,728, which is hereby incorporated by reference, was used instead of carbon black for the tests next described. The composition of the char is listed in Table 3.

TABLE 3

Elemental Composition of Char (MGT-11)

| Component | Weight Percent |
|---|---|
| Carbon | 77.1 |
| Hydrogen | 2.3 |
| Nitrogen | 1.2 |
| Sulfur | 0.4 |
| Oxygen | 10.1 |
| Ash | 8.9 |

Because of the high oxygen content in char, a significant amount of carbon monoxide will be produced in addition to hydrogen when char is gasified. At high temperatures, char is a good absorber of radiofrequency energy, and promotes rapid gasification when radiofrequency energy is applied to the char.

The reactor was filled with char, and radiofrequency energy was applied to the char and gas in the reactor. Nitrogen was used as a sweep gas. The gas production rates were measured at three different power inputs. Very little power was absorbed initially. When the char temperature increased, the power absorption increased rapidly. However, not all of the input power was used for the reaction because of the small size of the reactor.

The gas produced was increased from 4.3 to 370.8 cc/minute as the input power was increased from 700 to 1000 watts. The composition of gas produced from char at 1000 watts of radiofrequency power is shown in Table 4.

TABLE 4

Composition of Gas Produced from Char

| Component | volume % |
|---|---|
| $H_2$ | 39.27 |
| CO | 53.59 |
| $CH_4$ | 3.67 |
| $CO_2$ | 3.48 |

Before starting the test, the char was saturated with water using steam generated from the saturator near the bottom of the reactor. This was done to find the effect of water content in the char on gas production. The input power was maintained constant at 750 watts. The gas production rate was greatest at the beginning, and gradually decreased as the char was dried. Table 5 lists the rates and compositions of gas produced from char.

TABLE 5

Rates and Compositions of Produced Gas,
Wet Char Test

| Time, min | Rate, cc/min | $H_2$ | CO | $CO_2$ | $CH_4$ |
|---|---|---|---|---|---|
| 0 | 141 | 57.28 | 38.24 | 4.48 | 0 |
| 27 | 84 | 43.14 | 53.14 | 2.61 | 0.83 |
| 45 | 63 | 42.61 | 48.33 | 3.02 | 6.04 |

The gas composition from dried char was 12 cc/minute at 800 watts. A comparison of this rate with the data in Table 5 shows that the water in the steam significantly accelerates the char gasification rate in a radiofrequency energy field. As the char dried, the gas production rate and hydrogen concentration decreased. However, carbon monoxide concentration increased due to less water gas shift reaction.

In order to investigate further the effect of radiofrequency energy on the steam-char reaction rate, steam was introduced into the char bed from the saturator one hour after radiofrequency energy was introduced. As soon as the steam was introduced, the gas production rate increased rapidly from 63 to 513 cc/minute rate, and then decreased to 310 cc/minute. Because of the high gas production rate, the char was blown out the reactor tube. Available char in the reactor was completely consumed one hour after the steam was introduced. The rate and composition of produced gas from the steam-char test at three different times are shown in Table 6.

TABLE 6

Rates and Compositions of Produced Gas,
Steam-Char Test

| Time, min | Rate, cc/min | $H_2$ | CO | $CO_2$ | $CH_4$ |
|---|---|---|---|---|---|
| 24 | 432 | 36.94 | 62.69 | 0.0 | 0.36 |

TABLE 6-continued

Rates and Compositions of Produced Gas, Steam-Char Test

| Time, min | Rate, cc/min | Concentration, vol % | | | |
|---|---|---|---|---|---|
| | | H$_2$ | CO | CO$_2$ | CH$_4$ |
| 47 | 362 | 40.43 | 59.43 | 0.0 | 0.14 |
| 60 | 310 | 61.11 | 12.95 | 25.68 | 0.26 |

Hydrogen-to-carbon monoxide volume ratio was increased from 0.59 to 4.72 as char was consumed. The increase in H$_2$/CO ratio was due to the increase in the steam-to-char ratio as char was consumed. This suggests that hydrogen concentration can be maximized by using a proper ratio of steam to char. The data in Table 6 show that steam-char reaction and char gasification are significantly enhanced by radiofrequency energy.

Production of Hydrogen from Mild Gasification Char and Gas.

To find the technical feasibility for producing hydrogen from simultaneous processing of mild gasification char and product gas, the reactor was charged with 9.5 g char and 1.5 g Fe$_2$O$_3$. The standard gas, as shown in Table 2, was saturated at 217° F. and 7.5 psig in the saturator, and the mixed gas flowed into the bottom the reactor. The inlet gas flow rate was maintained at 12 cc/min. The compositions of inlet and outlet gas are shown in Table 7.

TABLE 7

| Gas Composition (vol. %), Steam-Char-Product Gas Test | | |
|---|---|---|
| Component | Inlet Gas | Outlet Gas |
| H$_2$ | 30.2 | 46.8 |
| N$_2$ | 24.93 | 1.12 |
| CO | 5.02 | 52.0 |
| CH$_4$ | 5.02 | 0.0 |
| CO$_2$ | 29.90 | 0.0 |
| H$_2$S | 4.93 | 0.0 |

The gas produced from char and gas from mild gasification of Eagle Butte Coal (from near Gilette, Wy.) contains only hydrogen and carbon monoxide. Methane and carbon dioxide were completely converted to hydrogen and carbon monoxide. Hydrogen sulfide was not detected in the outlet gas.

A similar test was conducted using the mixture of 9.5 g carbon black and 15 g Fe$_2$O$_3$. The outlet gas contained 46.3% hydrogen and 53.7% carbon monoxide. No hydrogen sulfide was detected in the outlet gas, although the inlet gas contained 4.93% hydrogen sulfide.

As shown above, radiofrequency energy significantly increases the reaction rate of the steam-char, char gasification rate, and the conversion rate of product gas from mild gasification processes. The use of radiofrequency energy as a reaction promoter may provide one of the most efficient methods to produce low-cost hydrogen from char and product gas produced from mild gasification processes.

Because the temperature of mild gasification char is approximately 1150° F., only radiofrequency energy is required to provide the heat of reaction. If the heat of reaction is supplied by radiofrequency energy, the gasification of on pound of char with steam will require one Kwh to produce 26 scf hydrogen and 24 scf carbon monoxide, or 0.69 Kwh to produce 50 scf hydrogen and 24 scf carbon dioxide with excess steam present. If the radiofrequency energy use efficiency is 90%, 47 Kwh will be required to produce one million Btu of hydrogen. Using 0.03/Kwh, the power cost is then $1.41/million Btu hydrogen. Because of this simple system, the hydrogen production cost is much cheaper than conventional production cost of hydrogen, which presently ranges from about $8.5 to about $22 per million Btu of hydrogen.

Figure 4:
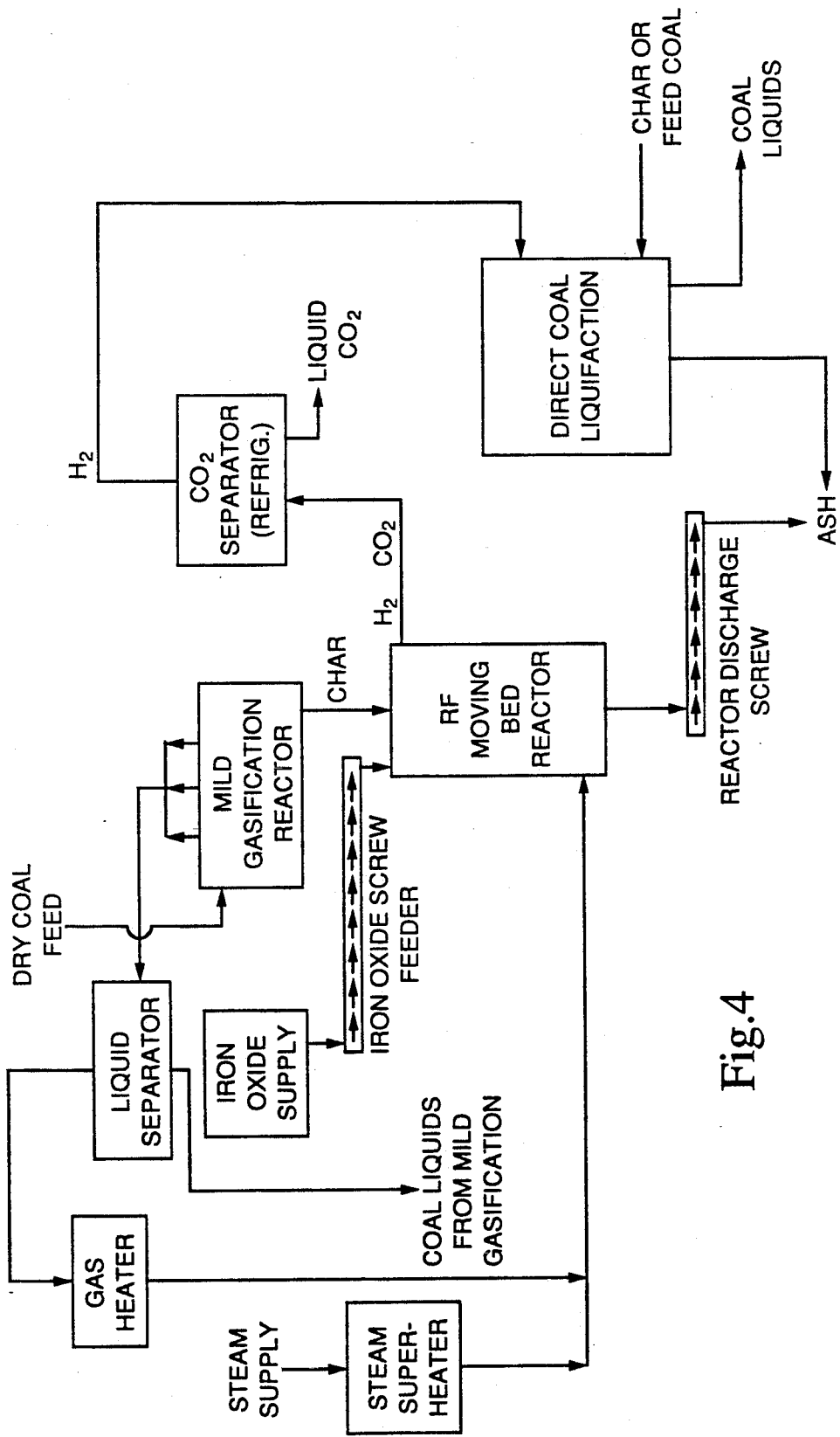
FIG. 4 shows a process flow diagram for low cost hydrogen production according to the present invention.

The commercial process for low-cost hydrogen production using the gaseous and solid products from mild coal gasification and superheated steam is shown in FIG. 4. In the mild gasification process, feed coal is partially devolatilized to produce gaseous, liquid, and solid products. The gas produced contains products typical of coal devolatilization, i.e., carbon monoxide, carbon dioxide, methane, hydrogen, and higher order hydrocarbon gases. The produced char contains no water, and is composed of approximately 10 to 20% volatile matter, 8 to 10% ash, and the remainder fixed carbon. These two products are reacted using radiofrequency to produce hydrogen, carbon monoxide, and carbon dioxide. The carbon monoxide formed is further reacted with steam using radiofrequency energy to produce carbon dioxide and hydrogen.

The radiofrequency reactor is a moving-bed reactor in which the product gas and superheated steam flow countercurrent to the char and iron oxide while radiofrequency energy is applied. The char exiting the mild gasification reactor is introduced into the top of the radiofrequency reactor. Iron oxide is also introduced into the top of the reactor using a screw conveyor. The product gas from the mild gasification reactor is heated to about 1000° F. and is introduced into the bottom of the radiofrequency reactor. Low pressure steam is superheated to 1000° F. and mixed with the hot product gas introduced into the bottom of the reactor. The radiofrequency energy applied to the moving bed promotes the reaction of the steam with fixed carbon in the char to produce hydrogen, carbon monoxide, and carbon dioxide. The radiofrequency energy readily reacts carbon monoxide and water to form carbon dioxide and hydrogen. In addition, the radiofrequency energy also causes methane and other hydrocarbon gases to react and produce hydrogen and carbon black. This gas produced in the radiofrequency reactor (primarily hydrogen carbon) exits the radiofrequency reactor near its top. The ash from the mild gasification char and the iron sulfide are removed from the bottom of the radiofrequency reactor using another screw conveyor. The residence time of the solid material in the radiofrequency reactor is controlled by the speed at which the screw conveyor removes the ash and iron sulfide.

Solids exiting the radiofrequency reactor are disposed of, while the hydrogen and carbon dioxide exiting are further processed. First, the carbon dioxide in the gas is removed by refrigeration. The processed carbon dioxide that is manufactured is a salable by-product. The remaining hydrogen gas is suitable for use as a feedstock for direct liquefaction or upgrading the liquid product produced in the mild coal gasification process. The latter option may have significant benefits because the mild coal gasification process produces approximately 18 weight percent of the coal as a liquid product.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A process for producing hydrogen, carbon monoxide, and carbon dioxide comprising contacting a mixture of pyrolytic carbon and water with radiofrequency energy.

2. The process according to claim 1 wherein said pyrolytic carbon further comprises char.

3. The process according to claim 2 wherein said char consists essentially of a product of mild gasification of coal.

4. The process according to claim 1 wherein said carbon monoxide produced further comprises an additional reactant with said water in the presence of radiofrequency energy to produce carbon dioxide and hydrogen.

5. The process according to claim 1 further comprising the addition of ferric oxide to remove sulfur-containing gases.

6. The process according to claim 1 wherein the exit gas temperature is less than 180° F.

7. The process according to claim 1 wherein said radiofrequency energy further comprises delivery by low frequency pulsing at approximately 60 cycles per second.

8. The process according to claim 1 wherein said radiofrequency energy further comprises ranging from 2450 to 5000 MHz.

9. A process for producing carbon dioxide and hydrogen comprising reacting water and carbon monoxide in the presence of radiofrequency energy.

10. The process according to claim 9 further comprising the reaction occurring near the surface of pyrolytic carbon.

* * * * *